United States Patent [19]

Brown et al.

[11] 3,904,802

[45] Sept. 9, 1975

[54] TRANSFER ELEMENTS AND METHODS OF PREPARING SAME

[75] Inventors: Albert E. Brown; Allan T. Schlotzhauer; Douglas A. Newman, all of Glen Cove, N.Y.

[73] Assignee: Columbia Ribbon and Carbon Manufacturing Co., Inc., Glen Cove, N.Y.

[22] Filed: Oct. 31, 1974

[21] Appl. No.: 519,401

[52] U.S. Cl. .............. 428/320; 427/152; 427/153; 428/914
[51] Int. Cl.² .... B41C 1/06; B41M 5/02; B32B 3/00
[58] Field of Search .......... 117/36.1, 36.4; 161/159, 161/160, 406

[56] References Cited
UNITED STATES PATENTS

| | | | |
|---|---|---|---|
| 3,194,676 | 7/1965 | Krumbein et al. | 117/36.1 |
| 3,287,153 | 11/1966 | Schwarz et al. | 117/36.1 |
| 3,314,814 | 4/1967 | Newman | 117/36.1 |
| 3,418,148 | 12/1968 | Barz | 117/36.4 |
| 3,471,360 | 10/1969 | Newman | 117/36.1 |

*Primary Examiner*—William J. Van Balen
*Attorney, Agent, or Firm*—Thomas L. Tully; Arthur A. Johnson

[57] ABSTRACT

Method for producing novel reusable pressure-sensitive transfer elements by solvent-coating techniques in which a composition comprising resinous film-forming binder material, incompatible oil, coloring matter and an aqueous vehicle is coated onto a flexible foundation and dried by evaporation of the aqueous vehicle. Transfer elements which are curl-resistant and substantially free of undesirable surface ink migration or "sweating" result from the use of a mixture of certain amounts of water-dispersible resinous film-forming binder materials comprising from 40 to 80% by weight of a water-insoluble film-former and from 60 to 20% by weight of a water-soluble film-former.

10 Claims, No Drawings

TRANSFER ELEMENTS AND METHODS OF PREPARING SAME

It is known to prepare transfer elements such as carbon papers and ribbons in which the transfer layer is based upon a film-forming binder material rather than a conventional wax binder and is applied to a flexible foundation in the form of a volatile organic solvent solution, rather than by the conventional hot-melt method.

It was found that film-formers such as vinyl polymers could be employed to great advantage as carriers or solid bases for pigments in the making of carbon papers and the like, and further that these polymers which are normally cohesive may be changed in their physical characteristics to form an ink-releasing film by compounding them with a non-volatile, non-compatible oily component which is capable of being retained by the polymer, together with coloring matter, and applying them to the foundation sheet as solutions dissolved in one or more volatile organic liquid solvents. The films thus cast are spongy, and while substantially none of the solid vinyl binding agent is transferred to the copy sheet, the non-compatible component and coloring matter exude to the copy sheet under pressure and are absorbed thereby. Thus the image material is essentially fluent and penetrates into the copy paper like a fabric ribbon ink providing a smudge-resistant copy.

It has been proposed to avoid many of the disadvantages inherent in the use of organic solvents and organic solvent-soluble resins by substituting hydrophilic film-forming binder materials for the organic solvent-soluble resin and substituting water for the volatile organic solvent in the manufacture of transfer elements. However, transfer elements of this type have not met with commercial success because of the many contradictory requirements such as the necessity of uniformly dispersing the insoluble oily component in the aqueous binder composition and the difficulty of placing and retaining a uniformly thick aqueous layer on a foundation which must be water-resistant.

Some of the problems arising from the use of hydrophilic film-forming binder materials and aqueous solvents to produce reusable transfer elements are overcome by the invention described in U.S. Pat. No. 3,314,814. According to that Patent, water-resistant flexible foundations are used in association with aqueous coating compositions which contain a certain required amount of an aliphatic solvent which gives the composition an affinity for the water-resistant foundation. Transfer elements produced according to this Patent have excellent properties with respect to the sharpness and tone of images prouded therefrom, reusability, and freedom of the surface of the ink layer from undesirable ink migration or sweating. However, it has been found that such transfer elements tend to curl or roll under changing conditions of temperature and/or humidity as may occur during normal use unless a curl-compensating coating is applied to the rear surface of the flexible foundation. Such a coating is undesirable because it involves additional expense, an additional coating step and increases the thickness of the transfer element. Furthermore, the aqueous compositions produced according to this Patent have a relatively low solids content and high water content which is disadvantageous because water requires the use of a large amount of heat for drying purposes.

It is the primary object of the present invention to use aqueous coating compositions to produce reusable pressure-sensitive transfer elements which have excellent imaging properties and surface cleanliness and which furthermore are resistant to curling under changing conditions of temperature and/or humidity as may occur during normal use.

It is another object of this invention to provide an aqueous coating composition containing a hydrophilic film-forming binder material and having an oily ink uniformly dispersed therein, said composition having a relatively high solids content and a relatively low water content to facilitate drying of the composition on a flexible foundation.

Still another object of this invention is to prepare non-wax transfer sheets which are curl-resistant, exceptionally clean to the touch and have excellent transfer qualities and retain these properties for extended periods of time and under diverse conditions of humidity and temperature.

An advantage of this invention is the preparation of coated transfer elements in a safe and economical manner without the use of large amounts of costly and highly combustible concentrated organic solvents, using minimum amounts of water which is costly to evaporate.

Still further objects and advantages are accomplished as more fully set out hereinafter and other features and advantages will hereinafter appear.

The present invention involves the discovery that the addition of a substantial amount of a water-dispersible water-insoluble synthetic thermoplastic resinous binder material to an aqueous ink-coating composition based upon a water-soluble hydrophilic film-forming binder material results in an aqueous composition which has an increased solids content and reduced viscosity and which produces a curl-resistant coating when applied to a flexible foundation and dried by evaporation of the aqueous vehicle. The modified composition has excellent coatability and has better affinity for a variety of flexible foundations than does a composition having a higher water content and lower solids content, due to the fact that the water-insoluble resin binder is less hydrophilic than the water-soluble binder and is present as a dispersed, finely-divided solid which clings to the foundation even before the aqueous vehicle is evaporated, whereas the water-soluble binder is retained dissolved in the aqueous vehicle and is prevented from clinging to the foundation until the aqueous vehicle is evaporated.

The novel transfer compositions of this invention comprise a binder material comprising from about 20% to about 60% by weight, most preferably from about 40 to 55% by weight, of a water-soluble binder material and from about 80% to about 40% by weight, most preferably from about 60 to 45% by weight, of a water-insoluble, water-dispersible synthetic thermoplastic resin, a non-volatile oily material which is not compatible with said binder material and a quantity of imaging material, and have a solids content of between about 25 and 40%.

The water-soluble hydrophilic film-forming binder material preferred for use according to the present invention is polyvinyl alcohol. However, other suitable water-soluble hydrophilic film-forming binder materials are colloid materials including proteinaceous materials such as casein, carbohydrates such as oxidized starch, ethyl hydroxyethyl cellulose, polyethylene oxide, and similar water-soluble materials.

The water-insoluble, water-dispersible synthetic thermoplastic resin preferred for use according to the present invention is polyvinyl acetate which is commercially-available in the form of stable aqueous dispersions including colloids, emulsions and latices. Such dispersions may have particle sizes as coarse as 2.0 microns but the particles are retained in stable dispersed condition within the aqueous vehicle by the presence of the dissolved polyvinyl alcohol or other water-soluble binder material, emulsifying agents, or the like. Dispersions of smaller particle size below about 0.5 microns form true stable emulsions and latices without the need for emulsifying agents or the like. The phrase "water-soluble resinous material" is used to identify resinous materials which are not only soluble in water but which produce water-soluble films when deposited from aqueous solvent and dried. The phrase "water-insoluble resinous material" is used to identify resinous materials which are dispersible in water as solutions, emulsions or colloids but which produce water-insoluble films when deposited from water and dried.

The preferred water-insoluble resinous materials are polyvinyl acetate latices and acrylic polymer dispersions. However, other water-dispersible materials are also suitable including latices of acrylic polymers such as Ucar 152, polyvinylidene chloride, polystyrene, butadiene-styrene copolymer and the like. Some materials, particularly some of the acrylic polymer dispersions identified by their manufacturers as aqueous solutions, are slightly milky in color and dry as substantially clear coatings. However, they produce water-insoluble coatings on drying or curing and thus are included herein and within the appended claims as being water-insoluble materials. Water-dispersible acrylic polymers include polymers of ethyl acrylate, methyl methacrylate, acrylamide, acrylonitrile, acrylic acid and copolymers thereof with each other. The phrase water-dispersible is used generically to include water-soluble materials and water-insoluble materials capable of stable suspension in an aqueous vehicle for prolonged periods of time.

The non-volatile, non-drying oleaginous material used in the present transfer composition is one which is not compatible with either the water-soluble binder or the water-insoluble, dispersed binder and is preferably a liquid but may also be of a pasty consistency. Preferred for this purpose are the oils such as the mineral, vegetable, animal and synthetic oils, among which may be listed mineral oil, castor oil, rapeseed oil, sperm oil, olive oil, cottonseed oil, etc. Semi-solid materials such as lanolin, petrolatum and hydrogenated vegetable oil may also be used, particularly in admixture with the above-named oils. Other suitable liquid, oily materials include oleic acid, butyl stearate, dibutyl- and dioctylphthalate, tricresyl phosphate, and the like. It should be pointed out that the particular oleaginous material must be selected depending upon its non-compatibility with the particular binder materials to be used, some of the above-named materials being compatible with some of the above-named binder materials. In formulating the compositions of the present invention, it is preferred to include a small amount of a volatile organic solvent such as toluol, ethanol, isopropanol, or the like, which is a solvent for the oleaginous material and which facilitates the uniform dispersion of the oleaginous material and ink into the aqueous coating composition.

Suitable aqueous vehicles which may be used according to the present invention are water and mixtures of water and volatile aliphatic solvents which are compatible with water in mixtures containing from 3 to 30% by weight of the aliphatic solvent. The preferred aliphatic solvents are the low molecular weight alcohols such as methanol, ethanol, isopropanol and butanol.

The aqueous transfer compositions of this invention preferably are applied to water-resistant or wet strength foundations such as sized or coated papers, plastic films and plastic synthetic papers since otherwise the web being coated may lose its dimensional stability and may even break during coating.

The present transfer elements preferably are prepared by formulating the ink separate from the binder material and thereafter mixing the two. The binder material is preferably formulated by (a) dissolving the water-soluble binder, such as polyvinyl alcohol, in water to form a solution such as one containing 8% by weight of the polyvinyl alcohol; (b) separately dispersing the water-insoluble, dispersible binder material, such as polyvinyl acetate, in water which may contain an emulsifying agent to form a stable dipersion such as one containing 60% by weight of the polyvinyl acetate; and (c) mixing the solution and the dispersion, with the addition of minor amounts of water, an emulsifying agent and/or an aliphatic solvent and/or a filler, if desired.

The ink is preferably formulated by mixing the oleaginous materials and pigments or dyes in the presence of a volatile solvent for the former, such as toluol. A wetting agent such as lecithin and a filler such as clay may also be included. The ink is mixed in a ball mill to insure uniformity, and thereafter the ink formulation and the binder material formulation are combined with agitation to form the coating composition.

The coating composition is applied by spreading it evenly over a suitable water-resistant foundation by suitable coating apparatus and causing it to dry and harden by evaporation of the aqueous vehicle to form a smooth pressure-sensitive microporous ink-releasing sheet of the type disclosed. It has been found advantageous in some instances to heat the final transfer sheet to help dry and set the transfer layer and provide a cleaner, more smudge-free product.

Depending upon the binder materials selected, the pigmentary material or coloring matter used, and the particular oleaginous ingredients employed, there will be substantial variations in the proportions of the ingredients which will produce the optimum results. The best proportions will in each case, however, be readily determinable by anyone skilled in the art of carbon ink preparation. As a guide to suitably selecting the proper proportions, it may be pointed out that in most cases they will lie within the ranges indicated by the following table:

| Ingredients | Parts by Weight |
| --- | --- |
| 1. Binder material (combination of water-soluble and water-dispersible materials): | 1 |
| 2. Oleaginous material: | 0.4 to 1.5 |
| 3. Pigment or other coloring matter: | 0.1 to 1 |
| 4. Water: | Amount sufficient to render the mixture readily |

| Ingredients | Parts by Weight |
|---|---|
| | coatable (Usually between about 2.5 and 6). |

An illustrative example of a new composition according to the present invention is as follows:

Example

| Ingredients | Parts by Weight |
|---|---|
| Polyvinyl alcohol (8% solution in water) | 56.0 |
| Polyvinyl acetate (55% dispersion in water) | 8.4 |
| Anionic emulsifying agent | 3.7 |
| Water | 7.5 |
| Ethanol | 7.5 |
| Cornstarch filler | 2.0 |
| Blue toner pigment | 1.0 |
| Peerless carbon black | 2.0 |
| Refined rapeseed oil | 6.4 |
| Lecithin (wetting agent) | 1.0 |
| Clay filler | 1.3 |
| Toluol | 3.2 |
| | 100.0 |

The binder material formulation comprising the first six ingredients and the ink formulation comprising the remaining six ingredients are separately prepared and are thereafter combined with agitation until a smooth, uniform consistency is reached. Other colors may be added as desired, either dry or in oil suspension, to intensify the color or change the hue.

The composition is then spread evenly on a water-resistant foundation sheet or web by suitable coating apparatus and caused to set and harden by evaporation of the volatile solvent mixture to form a smooth pressure-sensitive carbon coating having the properties described in detail heretofore.

As presently understood, the oleaginous ingredients(s), which are present in an amount in excess of the amount of the water-soluble hydrophilic binder material, polyvinyl alcohol as shown in the above Example, and which are non-solvents for and non-compatible with both the water-soluble and water-insoluble, water-dispersible binder materials, are uniformly distributed throughout the binder composition, and when the composition is coated upon the foundation sheet, and the aqueous solvent is evaporated, the oleaginous ingredient(s) form a discontinuous phase finely dispersed within the binder material, thereby forming a cellular or spongelike film in which the pores containing the oil and colorant are of microscopic size and even distribution. The coloring matter added to the composition appears to be distributed through the solidified film primarily, although probably not entirely, with the oil(s) in the discontinuous phase or pores.

The dispersed water-insoluble resin binder material, such as polyvinyl acetate, serves as several purposes. Since it is a dispersed rather than a dissolved binder material, it can be incorporated in large amounts without unduly increasing the viscosity of the coating composition or the water content thereof. This improves the coatability of the composition and reduces the amount of heat required to dry it. Also the composition has greater affinity for flexible foundations than compositions containing more water and based upon water-dissolved binder materials. However, the most important function of the dispersed water-insoluble binder material is its ability to reduce the shrinkage of the coating composition as it dries on the flexible foundation and to reduce the tendency of the dried coating to absorb moisture from the air under changing conditions of temperature and humidity. A dissolved binder material shrinks as it is dried into a continuous film whereas a dispersed binder material deposits as discrete particles when it is dried. Also a water-soluble binder material is hygroscopic whereas a water-insoluble binder is not. Thus the replacement of a substantial amount of the water-soluble binder material with the water-insoluble dispersed binder material has been found to result in a coating which does not curl or roll to any substantial extent initially or under exposure to varying conditions of humidity and temperature. However, we have found that it is necessary to use at least 40 parts by weight of the dispersed water-insoluble binder material for every 60 parts by weight of the water-soluble binder material in order to produce curl-resistant coatings of the present type.

However, the importance of the water-soluble binder material should not be overlooked since it is essentially this material which forms the microporous film containing the oily ink within the pores thereof. Attempts to use the dispersed water-insoluble binder material as the sole binder material result in the production of ink layers from which the oily ink migrates or sweats to the surface during storage, causing loss of ink, staining during handling, roller marks on the copy sheet and poor reusability. Even the addition of up to nearly twenty parts by weight of water-soluble binder material to slightly in excess of 80 parts by weight of the water-insoluble binder material does not reduce the severe sweating problem.

Most preferred results from the standpoint of curl-resistance or freedom from sweating are obtained when the binder material comprises from about 40% to about 55% by weight of the water-soluble binder and from about 60% to about 45% by weight of the water-insoluble binder, most particularly about 50% by weight of the former and about 50% by weight of the latter.

While the aqueous compositions of the present invention preferably are applied to water-resistant foundations such as sized papers or papers impregnated with wet strength reagents or plastic films including synthetic paper-like plastic sheets, the present aqueous compositions are found to have an affinity for such foundations due to the presence of the dispersed water-insoluble binder material which anchors to the foundation or the coating thereon and permits the composition to coat evenly on the foundation and form a solidified layer having good adherence for the foundation.

It is preferred in several instances, such as in the case of ribbons and sheets which have a smooth plastic film foundation and/or are to be reused a large number of times and/or which are used on imaging machines which exert a greater than normal imaging pressure, that a thin resinous intermediate bonding layer be applied to the flexible foundation as an anchoring coating for the ink layer. Such bonding layers are conventional in the art and include coatings of synthetic thermoplastic polymers deposited from volatile solvent solutions which may contain fillers or pigments. Preferred bonding layers are those applied from a water vehicle. A novel and particularly effective bonding layer for use with the present ink layers is one based upon a mixture containing from 40 to 80% by weight of the present water-insoluble, water-dispersible synthetic thermoplastic resins, such as polyvinyl acetate or an acrylic polymer, and from 60 to 20% by weight of a water-soluble film-forming binder material such as polyvinyl alcohol or polyethylene oxide. Such bonding layers do not cause the transfer element to curl or roll, and they have excellent affinity for the water-applied ink layer due to their particular structure and the presence of the water-soluble binder which has high affinity for the water of the ink coating composition.

If desired, the imaging material may comprise dyes dissolved in the oleaginous ink vehicle, nigrosine or substantially colorless color-formers which form colored images upon contact with a coreactive complementary color-former or catalyst. Such latter materials include dye components, gallic acid-iron chloride systems and the like, well known to the art of carbonless copy.

Variations and modifications may be made within the scope of the claims and portions of the improvements may be used without others.

We claim:

1. The process of preparing a pressure-sensitive transfer element comprising a flexible foundation carrying a uniform water-applied pressure-sensitive microporous coating containing pressure-exudable ink composition, which comprises the steps of forming a coating composition comprising a binder material containing from about 40 to 80% by weight of a water-insoluble, water-dispersible synthetic thermoplastic resin and from about 60 to 20% by weight of a water-soluble film-forming material, an oleaginous material which is incompatible with said binder material, a quantity of imaging material, and an aqueous solvent; applying said coating composition to a flexible foundation in the form of a coating of uniform thickness; and evaporating said aqueous solvent to solidify the coating and form a microporous structure containing within the pores thereof a pressure-exudable ink composition containing said oleaginous material and said imaging material.

2. The process of claim 1 in which the binder material comprises from about 40% to about 55% by weight of the water-soluble film-forming material and from about 60% to about 45% by weight of the water-insoluble resin.

3. The process of claim 1 in which a film-forming bonding layer comprising a water vehicle and a water-dispersible binder material is first applied to the flexible foundation and dried by evaporation of the water, and the ink coating composition is applied over said bonding layer.

4. A pressure-sensitive transfer element comprising a flexible foundation having thereon a thin, microporous, water-applied ink layer comprising a microporous structure of resinous binder material containing within the pores thereof a pressure-exudable ink comprising an oleaginous material which is incompatible with said binder material and imaging material, characterized by said binder material comprising from about 40 to 80% by weight of a water-insoluble, water-dispersible synthetic thermoplastic resin and from about 60 to 20% by weight of a water-soluble film-forming material.

5. A transfer element according to claim 4 in which the water-soluble film-forming material comprises polyvinyl alcohol.

6. A transfer element according to claim 4 in which the water-soluble, film-forming binder comprises polyethylene oxide.

7. A transfer element according to claim 4 in which the water-insoluble, water-dispersible resin comprises an acrylic polymer.

8. A transfer element according to claim 4 in which the water-insoluble resin comprises polyvinyl acetate.

9. A transfer element according to claim 4 in which the binder material comprises from about 40 to 55% by weight of the water-soluble, film-forming material and from about 60 to 45% by weight of the water-insoluble resin.

10. A transfer element according to claim 4 in which a bonding layer comprising a water-dispersible, film-forming binder material is present between the foundation and the ink layer.

* * * * *